(12) United States Patent
Büchi

(10) Patent No.: US 7,028,829 B2
(45) Date of Patent: Apr. 18, 2006

(54) TRANSPORT OF BULK MATERIAL ITEMS

(76) Inventor: Felix Büchi, Giessenstrasse 15, CH-8953 Dietikon (CH)

( * ) Notice: Subject to any disclaimer, the term of this patent is extended or adjusted under 35 U.S.C. 154(b) by 0 days.

(21) Appl. No.: 10/515,542

(22) PCT Filed: Jun. 3, 2003

(86) PCT No.: PCT/CH03/00345

§ 371 (c)(1),
(2), (4) Date: May 16, 2005

(87) PCT Pub. No.: WO03/104116

PCT Pub. Date: Dec. 18, 2003

(65) Prior Publication Data

US 2005/0199470 A1    Sep. 15, 2005

(30) Foreign Application Priority Data

Jun. 6, 2002    (CH) .................................... 0958/02

(51) Int. Cl.
*B65G 47/26* (2006.01)
(52) U.S. Cl. ...................................... 198/444; 198/443
(58) Field of Classification Search ................ 198/443, 198/444, 437, 341.01, 341.03
See application file for complete search history.

(56) References Cited

U.S. PATENT DOCUMENTS

| | | | |
|---|---|---|---|
| 4,527,326 A * | 7/1985 | Kohno et al. ................ | 198/444 |
| 4,678,073 A * | 7/1987 | Anderson et al. ........... | 198/396 |
| 4,697,689 A * | 10/1987 | Carrell ........................ | 198/444 |
| 5,299,693 A * | 4/1994 | Ubaldi et al. ................ | 198/444 |
| 5,427,224 A * | 6/1995 | Suehara et al. .............. | 198/396 |
| 5,526,917 A * | 6/1996 | Homma ....................... | 198/444 |

* cited by examiner

*Primary Examiner*—James R. Bidwell
(74) *Attorney, Agent, or Firm*—Bachman & LaPointe, P.C.

(57) ABSTRACT

A device (10) for feeding bulk material items (12) from a mass multiply arranged one above the other in a store (14) into a randomly re-alignable, individually distributed and disentangled position within the reach of a robot (18) comprises a substantially horizontally arranged oscillating conveyor surface (16) with first apparatus (58, 60) for the forward feed or reverse transport of the bulk material items (12) in the x-direction or in the x- and y-direction of the space coordinates and a second apparatus (62) for exciting an oscillation of the oscillating conveyor surface (16) in the z-direction of the space coordinates.

18 Claims, 4 Drawing Sheets

TRANSPORT OF BULK MATERIAL ITEMS

BACKGROUND OF THE INVENTION

The invention relates to a device and a method for feeding bulk material items from a mass multiply arranged one above the other in a store into a randomly re-alignable, individually distributed and disentangled position within the reach of a robot, the device comprising a substantially horizontally arranged oscillating conveyor surface with means for the forward feed or reverse transport of the bulk material items in the x-direction or in the x- and y-direction of the space coordinates, means for exciting an at least partial oscillation of the oscillating conveyor surface in the z-direction of the space coordinates, a vision system with a camera or a sensor for individual detection of the number, position and alignment of the individual bulk material items, and a processor for processing the sensor signals and generating control commands to actuators.

In the industrial production and fitting of consumer goods, more or less complicated mass-produced parts are frequently provided in bulk material form for further processing. For the following processing and/or fitting operations, the bulk material items are required to be disentangled, separated and in a position which is aligned in a defined manner. Vibrating spiral conveyors, in which mechanical baffles are provided along a conveyor spiral, are often used for this purpose. These align the bulk material items along their conveying direction or eliminate them so that only correctly aligned bulk material items arrive at the discharge site. An additional mechanical apparatus can arrange the separation and fine positioning of the bulk material items which can be controlled and removed by a handling system or a robot owing to these preparatory operations.

The arrangement and design of baffles has to be specifically optimised for each type of bulk material item. The flexibility of the spiral conveyor has been further improved in the last 10 to 15 years by the use of active baffles (sensor/actuator) and replaceable baffles/positioning stations but these cannot yet meet the current demands from industry for flexible self-correcting feeds which can be programmed for different bulk material items.

A plurality of known flexible feed systems consist of one unit which mechanically processes the bulk material items such that they are recognised by a vision system known as an image processing system (machine vision) and can be removed by a robot. Bulk material items which are not recognised migrate back into the provided bulk material and reappear at a later instant.

In a known device for flexibly feeding bulk material items 12 according to FIG. 1, these are partially processed in a store 14. The bulk material items 12 leave the store 14 on a conveyor surface 16 and migrate in the direction of a robot 18 with a pivoting arm 20, which has a gripper tool 24 for bulk material items 12, which can be rotated about this shaft 22 and is fastened at the end face to a height-adjustable shaft 22.

A camera 26 determines, in a selection zone 28 which is shown by dotted lines, the exact position of the bulk material items 12 in the desired preferred position. With the aid of transmitted data, a robot controller 30 calculates the coordinates and correspondingly triggers the actuators of the robot 18, which grasps the bulk material items 12 that are arranged in the mentioned desired preferred position, in the speed of seconds. The removed bulk material items 12 are placed on a conveyor belt 34 and supplied for further processing and this is indicated by an arrow 32.

The bulk material items 12 which are not grasped by the robot 18, on the other hand, are recycled in the store 14 and guided again in random arrangement into the selection zone 28 by way of the conveyor surface 16 with further bulk material items 12 stored in the store.

All the bulk material items 12 contained in the store 14 have to be replaced at periodic intervals, so defective bulk material items 12 do not remain in constant rotation.

U.S. Pat. No. 5,687,831 describes a device for feeding bulk material items, which contains a substantially horizontal conveyor surface. The bulk material items are transported to a selection zone, where the arranged and aligned bulk material items are located by means of a video camera, grasped by a robot and transferred to a fitting system. The bulk material items which are not removed are guided back to the beginning of the conveyor surface by means of a recirculation system for a renewed passage. During the return, the position and alignment of the bulk material items is changed such that they are aligned as favourably as possible during the next passage and can possibly be selected and removed in the selection zone. The device according to U.S. Pat. No. 5,687,831 can probably process a wide variety of bulk material item shapes but it is constructionally relatively complex and requires a substantial overall volume for the arrangement of the conveying surface, the selection zone and the recirculation system.

In a device for flexibly feeding bulk material items according to U.S. Pat. No. 6,056,108, a flexible membrane is arranged for the transport of flexible bulk material items, on which membrane a selection zone is defined. In this region, the position of the bulk material items is analysed by a mechanical vision system. The sensor signals are converted in a processor to control commands which selectively trigger the transmission of a pulse to specific points of the flexible membrane, so the position of at least some bulk material items is changed in the selection zone and is brought into a desired positive alignment. These bulk material items with the desired alignment are selected and removed from the membrane by a robot.

A feed device for the bulk material items to a robot according to WO,A1 00/69240 comprises a selection zone of an apparatus which is accessible to the robot for randomly changing the position and/or alignment and an apparatus with a parts recirculation element for recirculating the bulk material items which are not grasped. The apparatus for randomly changing the position and/or alignment of the bulk material items is a vibration platform simultaneously designed as a selection zone. In a first relative position of the recirculation element and vibration platform, the platform can be loaded with bulk material items of the recirculation element. In a second relative position, the bulk material items which drop from the vibration platform can be caught by the recirculation element. During operation of the device for feeding bulk material items for a robot, at least six steps are carried out one after the other in a continuous endless process. In a first step, the vibration platform is loaded with bulk material items from the parts recirculation element. In a second step, bulk material items dropping from the vibration platform are caught by the recirculation element. In a third step, the position and/or alignment of the bulk material items on the vibration platform is randomly changed. In a fourth step, the position and alignment of the bulk material items is detected and the data transmitted to the robot, which in a fifth step grasps bulk material items in a favourable position and alignment and conveys them away. In a sixth step, the number of bulk material items remaining on the vibration platform is determined and depending on the result, returned to the first or second step.

The object of the present invention is to provide a device and a method of which Improve and simplify the feeding of bulk material items from a store to a robot.

SUMMARY OF THE INVENTION

The object is achieved according to the device of the present invention in that a one-piece oscillating conveyor surface is supported by an oscillating conveyor arm, which oscillating conveyor surface with first or with first and second means is supported so as to be horizontally displaceable in the x-direction or in the x- and y-direction and extends from a storage zone over a distribution zone to the front end of a selection zone for the bulk material items and projects freely, together with the oscillating conveyor arm, the storage, distribution and selection zone having an edge, and third means for generating the oscillating motion in the z-direction are connected to the oscillating conveyor arm. Special and further embodiments of the device according to the invention are set forth hereinbelow.

The oscillating conveyor arm is substantially board-shaped and generally elongate in design, consists of an adequately mechanically rigid, resilient material, and can oscillate freely at one end in the region of the distribution and selection zone within the edge and thus throw up the bulk material items for realignment. The forward feed and a possible reverse transport of the bulk material items take place in that the one-piece oscillating conveyor surface which is supported by the oscillating conveyor arm can be moved with the first means linearly in the x-direction of the free end of the selection zone, or with first and second means in a planar manner in the x-direction of the front end of the selection zone, and in the y-direction perpendicularly thereto. In both cases, a targeted conveying direction is possible owing to corresponding means of the first or first and second means. The oscillating conveyor arm is generally rigidly mounted in the region of the storage zone, but, in the case of smaller systems, can also be displaceably mounted in the x- or x- and y-direction owing to the smaller mass of the oscillating conveyor arm and can be rigidly connected to the oscillating conveyor surface. In larger systems, an oscillating conveyor arm which is movable in the x- or x- and y-direction could lead to unreliable oscillations of the machine table because of the larger mass.

A desired bending region is preferably formed in the oscillating conveyor arm between the storage and the distribution zone and this takes place owing to at least one transversely extending weakening groove and/or hole. A weakening groove is expediently arranged at the bottom, two weakening grooves can be arranged located at the bottom next to one another or one above the other, the latter only if the oscillating conveyor surface which is supported on the oscillating conveyor arm is sufficiently load-bearing in the region of the groove. More than two grooves are arranged correspondingly. Two or more holes can likewise be arranged next to, or one above the other, also in combination with grooves. The geometric cross-sectional shape of the grooves and holes is not of substantial significance. Instead of the formation of at least one groove and/or one hole, the oscillating conveyor arm can be designed to form a weakening line in two parts, the two parts being connected to at least one spring, preferably by way of one or more leaf springs, for example made of spring steel. The formation of a weakening line causes the oscillating conveyor arm to act practically like a hinge and to have a much lesser spring action. The spring constant of the oscillating conveyor arm with respect to this "axis of rotation" is determined in practice by the spring of a lifting cylinder for the excitation of oscillation in the z-direction.

The first and second means acting in the x- and optionally also in the y-direction of the coordinate system on the oscillating conveyor surface, or on the oscillating conveyor arm, as well as the third means acting, preferably in a spring-mounted manner, on the oscillating conveyor arm, are in practice, for example, pneumatic or hydraulic lifting cylinders which are known per se with a piston and piston rod, but electrical linear or stepping motors can also be used. Because of the rapid working cycle in fractions of seconds, spindles with a rotor would be more problematic, for example.

In the time span between detecting the position and alignment of the bulk material items in a favourable position and grasping by the robot, the oscillating conveyor surface must neither move in the x- nor y-direction, because otherwise the coordinates calculated by the processor on the basis of the sensor signals for grasping favourably arranged bulk material items would no longer be correct. Likewise, during this time period, the oscillating motion in the z-direction has to be stopped. This generally takes place with means damping the oscillating motion in the z-direction at the oscillating conveyor arm, expediently with a damping cylinder which is known per se, a rubber ball or a rubber bellows.

A sensor for measuring the deflection and frequency of the oscillating conveyor arm is expediently arranged therebelow. From the measured values which are determined, the processor can calculate the inherent frequency of the oscillating conveyor arm with the components fastened thereto, and the amplitude for each position on the oscillating conveyor surface, and evaluate them for industrial processes. The inherent frequency of the oscillation in the z-direction is also influenced by the design of weakening grooves and/or holes in the desired bending region. The energy required to generate an oscillating motion can thus be reduced and the process be made more efficient than in a frequency other than the inherent frequency which is basically also possible.

The front end edge of the selection zone, which ends the forward feed movement of the bulk material items, is preferably also designed so as to be automatically removable, in particular as a slide, door or flap.

The front end edge of the storage zone can also similarly be expediently removed if a new batch of different bulk material items is to be fed. The oscillating conveyor surface can thus be rapidly and easily emptied, even automatically in all zones, including the store. The removable part of the edge is also expediently designed here as a slide, door or flap.

To individualise the sliding and/or rolling resistance of the bulk material items, the oscillating conveyor surface can be replaced; it consists, for example of a polyamide. Furthermore, the oscillating conveyor surface can be roughened or textured in design or have a coating, in particular a woven or nonwoven fabric to change its static friction. On the other hand, the oscillating conveyor surface, apart from optimum static friction, also has to have low abrasion, in other words be as mechanically wear-resistant as possible.

According to a special embodiment, the oscillating conveyor arm with the oscillating conveyor surface is designed to be transparent, at least in the region of the selection zone, and a backlight is arranged below this zone.

The object is achieved according to the method of the present invention in that an oscillating motion is generated in the z-direction with a programmable amplitude which is continuously increasing in the x-direction, and therefore correspondingly increased speed and acceleration of the bulk material items, which oscillating motion takes place alternatingly or at least partially simultaneously and coordinated with a forward feed or reverse transport of the bulk material items in the x- or in the x- and y-direction, wherein, during the time period of a snapshot by the vision system until removal of bulk material items by the robot, all movements of the oscillating conveyor surface in the x- or in the x- and y-direction are stopped and the oscillating motions in the z-direction are damped or stopped. Special and further method variants are described hereinbelow.

Owing to the oscillating amplitude of the oscillating conveyor arm increasing in the z-direction and the co-oscillating oscillating conveyor surface with correspondingly increased speed and acceleration of the bulk material items, the degree of reorganisation and individualisation in the direction of the front end of the selection zone also increases continuously and this has positive effects for the practical course of the method.

The oscillating amplitude which is increasing in the x-direction is preferably generated by transmitting a programmable oscillating motion, in particular with a frequency of 5 to 30 Hz, to an oscillating conveyor arm which is freely projecting outside a storage zone and which is supporting the entire surface area of an oscillating conveyor surface. The one-piece oscillating conveyor surface according to the invention also allows the feeding of small and flat bulk material items which would jam or even disappear on transfer from one oscillating conveyor surface to another.

The forward feed movement of the oscillating conveyor surface which is supported over the entire surface area by the oscillating conveyor arm or connected thereto, in the x- or in the x- and y-direction, and the corresponding reverse transport movement preferably take place with different acceleration. In the case of transport in the direction of the front end of the selection zone, the acceleration to the forward movement takes place so slowly that the bulk material items do not slide or only a little. The acceleration to the return transport movement, on the other hand, takes place so quickly in this transport direction that the bulk material items remain in place due to their inertia or only displace slightly. Both movements take place within fractions of seconds. In addition to the resulting forward feed direction, the bulk material on the oscillating conveyor surface is separated and distributed randomly in a random position owing to this rapid back and forth movement of the oscillating conveyor surface. A forward feed of a plurality of centimetres per second can thus be achieved, in the selection zone region, the bulk material items are present in an adequate number and adequately distributed for the gripper of the robot.

If too many bulk material items should be in the selection zone, instead of a forward feed movement, a reverse movement can be achieved in that the slower movement in the x- or x- and y-direction takes place toward the storage zone, and the faster one toward the selection zone.

A forward feed movement of the bulk material items can also be achieved in that a forward feed movement is jerkily interrupted and, because of the kinetic energy of the bulk material items, they are made to slide, for example by a hard stop, the reverse movement, on the other hand, is interrupted more slowly. Obviously, combinations of the two forward feed or reverse transport variants is also possible.

All the movements of the oscillating conveyor surface in the x-, y- and/or z-direction are preferably controlled and coordinated by the processor, preferably according to signals of the camera or another sensor by way of the number, position and/or alignment of bulk material items in the selection zone. The forward feed or reverse transport of the bulk material items can be determined by movements of the oscillating conveyor surface in the x- or x- and y-direction, the random change of the alignment of these bulk material items, by the amplitude and frequency of the oscillating movement in the z-direction.

Faulty bulk material items are generally not aligned even after numerous working cycles such that they are recognised and grasped by the robot with the same probability as the others, and this leads to an accumulation of the "poor" bulk material items in the region of the selection zone. When this proportion of "poor" bulk material items in the selection zone, established with the aid of signals from the camera or another sensor, is exceeded, the processor preferably controls an actuator for automatic opening of the front end edge, whereby all bulk material items located in the selection zone are removed, "good" and "poor". Expediently, the front edge is only opened after reduction or stopping of the feeding of bulk material items from the storage zone, so the proportion of eliminated "good" bulk material items can be reduced.

The advantages of the present invention can be summarised as follows:

- Owing to the design of an oscillating conveyor arm freely projecting from the storage zone into the distribution and selection zone, with a substantially horizontal oscillating conveyor surface, oscillations in the z-direction can be generated with increasing amplitude and speed in the conveying direction. This simplifies and improves the continuous separation, and where necessary, disentanglement of the bulk material items in the conveying direction and increases the efficiency of the recombination to the new random alignment of the bulk material items.
- The inherent frequency of the machine configuration, which is favourable in terms of energy, with the oscillating conveyor arm, can be used for the oscillating motion in the z-direction.
- The one-part design of an oscillating conveyor surface which is also resting exchangeably on an oscillating conveyor arm allows efficient conveying of the bulk material items in the forward feed or reverse transport direction, the selection zone can be quickly supplied with new bulk material items or freed of excessive bulk material items.
- The elimination of "poor" bulk material items from the selection zone can be carried out efficiently and with low losses of good bulk material items.
- The device can be easily and automatically emptied of all bulk material items for the purpose of adaptation to another product or cleaning of the device.

BRIEF DESCRIPTION OF THE DRAWINGS

The invention will be described in more detail with the aid of embodiments shown in the drawings, which are also the subject of dependent claims.

In the drawings.

DETAILED DESCRIPTION

Figure 2:
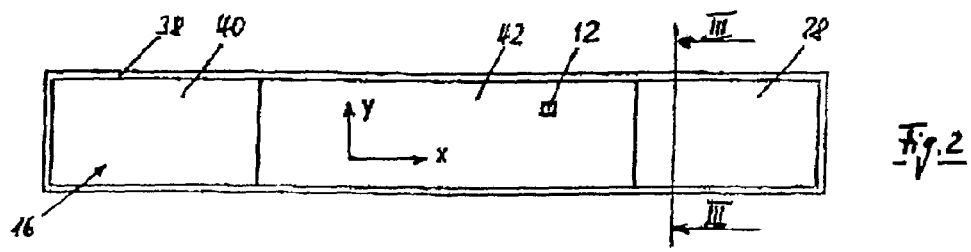
FIG. 2 shows a plan view of the oscillating conveyor region of a device for feeding bulk material items in accordance with the present invention.

FIG. 2 shows a plan view of a conveyor surface 16 with an edge 38. The one-part conveyor surface 16 is functionally divided into a storage zone 40, a distribution zone 42 and a selection zone 28, the transition from zone to zone not being sharp, as shown by lines, but flowing within a region and without interruption on the surface, in particular between the distribution zone 42 and selection zone 28. The conveying direction of the bulk material items 12 is designated by the space coordinate x. In particular in the case of a broad oscillating conveyor surface 16, the forward feed of the bulk material items 12 may not only take place in the x-direction, but also in the x- and y-direction.

Figure 3:
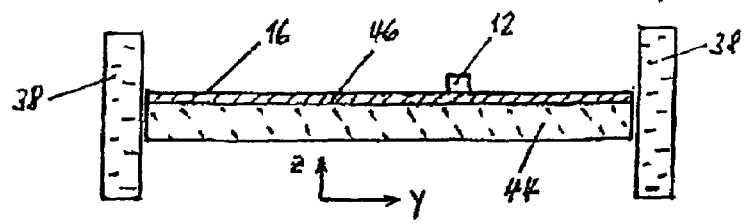
FIG. 3 shows a cross-section along the line III—III of FIG. 2.

FIG. 3 shows the arrangement of a freely projecting oscillating conveyor arm 44 in the rest position, which bears an easily replaceable layer 46 which forms the oscillating conveyor surface 16 and can be displaced relative to the oscillating arm 44, at least in the x-direction, in the present case the layer is made of a polyamide plate. The oscillating conveyor arm 46 is board-shaped in design and consists of elastically resilient material with high mechanical strength, for example made of an aluminium plate of 100×30×1 cm. In the transition region from the storage to the distribution zone, a semi-cylindrical transverse groove is recessed on the underside, which groove leaves a material thickness of 0.3 cm at the weakest point. The oscillating conveyor arm 44 which is rigidly mounted at one end is arranged with play between a fixed edge 38 which projects at the bottom and top and thus protects the bulk material items 12 which are arranged on the oscillating conveyor surface 16 from being thrown off when the board-shaped oscillating conveyor arm 44 oscillates in the z-direction in the manner of a springboard.

Figure 4:
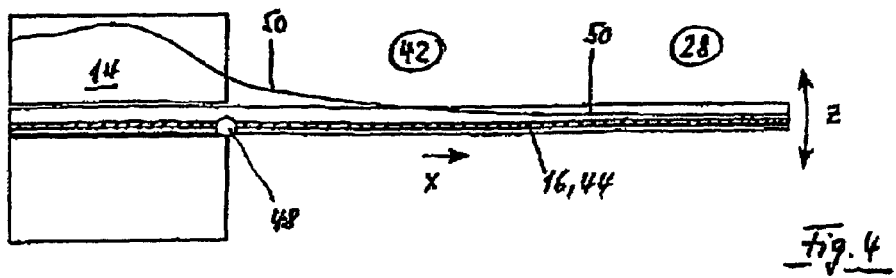
FIG. 4 shows a view of a plan of the region according to FIG. 2.

The oscillating conveyor arm 44 which is projecting a long way according to FIG. 4, with the displaceably supported oscillating conveyor surface 16, can oscillate freely as shown by the double arrow z, with the oscillating conveyor surface co-oscillating. The oscillating conveyor arm is rigidly anchored in the region of the store 14 or the storage zone 40 (FIG. 2), but can also be displaced in the x- or x- and z-direction according to a variant. In the transition from the storage zone 40 to the distribution zone 42 (FIG. 2), as already mentioned, a bending zone 48 is formed, which can be more narrowly localised by suitable weakening measures in the form of grooves and/or holes and leaf springs connecting two parts (FIG. 5 to 7).

A level line 50 of the bulk material items 12 (FIG. 2, 3) is drawn in in FIG. 4. This line shows the limitation of the bulk material items 12 which are lying one on top of the other in the store 14; it becomes lower toward the store exit, in the distribution zone 42, the bulk material items 12 become more and more separated by the increasing oscillation amplitude and speed in the x-direction and are finally present individually in the selection zone 28.

Figure 5:
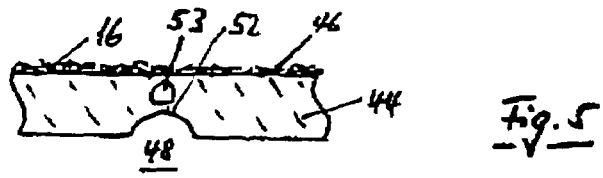
FIG. 5 shows a partial longitudinal section through an oscillating conveyor arm with an oscillating conveyor surface in the desired bending region.
Figure 6:
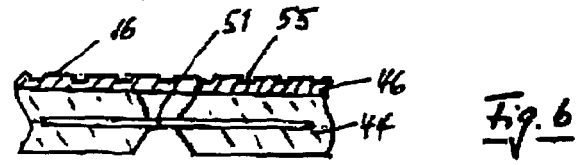
FIG. 6 shows a variant of FIG. 5.
Figure 7:
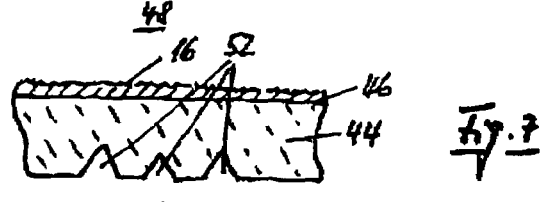
FIG. 7 shows a further variant of FIG. 5.

FIG. 5 to 7 show the oscillating conveyor arm 44 with the oscillating conveyor surface 16, which is displaceable thereon, in the region of a bending zone 48. This bending zone 48 is better localised according to FIG. 5 by a cross-sectional segment of a circle-shaped transverse groove 52 on the underside of the oscillating conveyor arm 44 and a hole 53. According to FIG. 6, the oscillating conveyor arm 44 is designed in two parts and connected in the bending zone 48 to a leaf spring 51 made of spring steel and this leads to a weakening with a hinge effect. In FIG. 7, the localisation of the bending zone 48 takes place owing to three triangular transverse grooves 52 located at the bottom, which may be the same or different with respect to the cross-sectional region.

The oscillating conveyor surface 16 according to FIG. 5 is formed by a nonwoven fabric arranged on a plate 46 which can be displaced in the x-direction and according to FIG. 6 by a displaceable plate 46 with transversely and/or diagonally extending millings 55, which can also extend in a fluted manner. FIG. 7 shows the oscillating conveyor surface 16 roughened in design. The plate-shaped layers 46 can be lifted off from the oscillating conveyor arm 44 and replaced, if necessary.

According to a variant, not shown, for small systems, the oscillating conveyor arm 44 and the layer 46 for the oscillating conveyor surface 16 can be formed in one piece and consist of the same material, for example a polyamide.

Figure 8A:
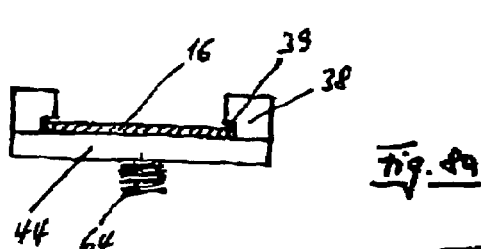
FIG. 8a shows a cross-section in the region of the oscillating conveyor arm.
Figure 8:
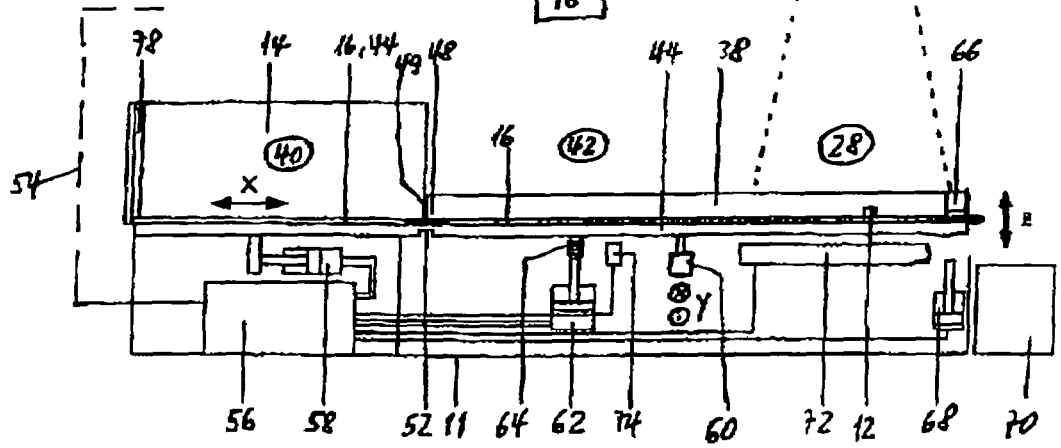
FIG. 8 shows a cut-open view of a large device for feeding bulk material items.

A device which is shown in FIG. 8 for feeding bulk material items 12 has an oscillating conveyor surface 16 which is supported over the entire surface region by an oscillating conveyor arm 44, the oscillating conveyor surface 16 in turn comprising a storage zone 40, distribution zone 42 and selection zone 28. A CCD camera 26 or another sensor, for example radar or ultrasound, monitors the selection zone 28 and is connected to a processor 56 by way of an only partially indicated electrical conductor 54, the processor processing the received signals and triggering the various actuators in a targeted manner. Collisions of the robot gripper with bulk material items 12 are also detected and reported; the processor 56 initiates suitable measures.

The oscillating conveyor arm 44 with the oscillating conveyor surface 16 is rigidly mounted in a manner which is known per se in the storage zone 40 and projects freely over the distribution zone 42 and selection zone 28. In the bending zone 48, a cross-sectionally rectangular transverse groove 52 is recessed in the oscillating conveyor arm 44.

The first means 58 for displacing the oscillating conveyor arm 44 in the x-direction are designed as pneumatically or hydraulically actuated lifting cylinders 58, with the piston rod exerting an impact or tensile force.

Optional second means 60 are similarly designed; they push or pull the oscillating conveyor surface 16 in the y-direction. The two movements take place in a coordinated manner, simultaneously or one after the other.

Third means 62, also designed as pneumatic or hydraulic cylinders, set the free part of the oscillating conveyor arm 44 into an oscillating motion, preferably with the inherent frequency of the relevant machine configuration. The impact pulse of the piston rod is transmitted elastically by way of a spring 64, the lifting movement is thus coupled in a less rigid manner. This spring 64 substantially determines the spring constant of the oscillating conveyor arm 44 with the oscillating conveyor surface 16, in the case of weakening of the bending zone 48, in particular in the case of pronounced weakening.

A front end part 66 (reject gate) of the edge 38 adjacent to the selection zone 28 can be actuated by a vertically acting pneumatic or hydraulic cylinder 68, in the present case by lifting. The selection zone can thus be easily cleaned, and the removed bulk material items 12 fall into a cleaning container 70.

The edge 38 is completely or practically completely severed in the region of the bending zone 48 by a cut 49. The edge 38 with the oscillating conveyor arm 44 and the oscillating conveyor surface 16 can thus be bent off or angled off. According to a variant, the edge 38 consists of flexible material.

In the case of FIG. 8, the selection zone 28 of the oscillating conveyor surface 16 and oscillating conveyor arm 44 are transparent in design. Below the oscillating conveyor arm 44 is arranged a backlight 72, and this, in particular, facilitates recognition of the alignment of the bulk material parts 12.

Finally, a sensor 74 which monitors the effective deflection of the oscillating conveyor arm 44 and therefore of the oscillating conveyor surface 16 is arranged under the oscillating conveyor arm 44. If the desired value for the amplitude of the oscillating motion in the z-direction is exceeded, the third cylinder 62 returns to the basic position and a damping means 76 (FIG. 10) in the form of a damping cylinder, travels upwards and stops the oscillating conveyor arm 44 very quickly and brings it into a defined horizontal position. This sensor 74 is also used to automatically detect the inherent frequency for an existing machine configuration. The oscillating conveyor arm 44 is briefly excited on switching on, the processor 56 analyses the sensor signal and determines the specific inherent frequency.

The raised edge 38 in the front end region of the storage zone 40 is also designed as a liftable part 78 (purge gate), which is actuated by means, not shown. After this part 78 of the store 14 has been lifted, a product change with other bulk material items 12 can also be carried out automatically.

Figure 1:
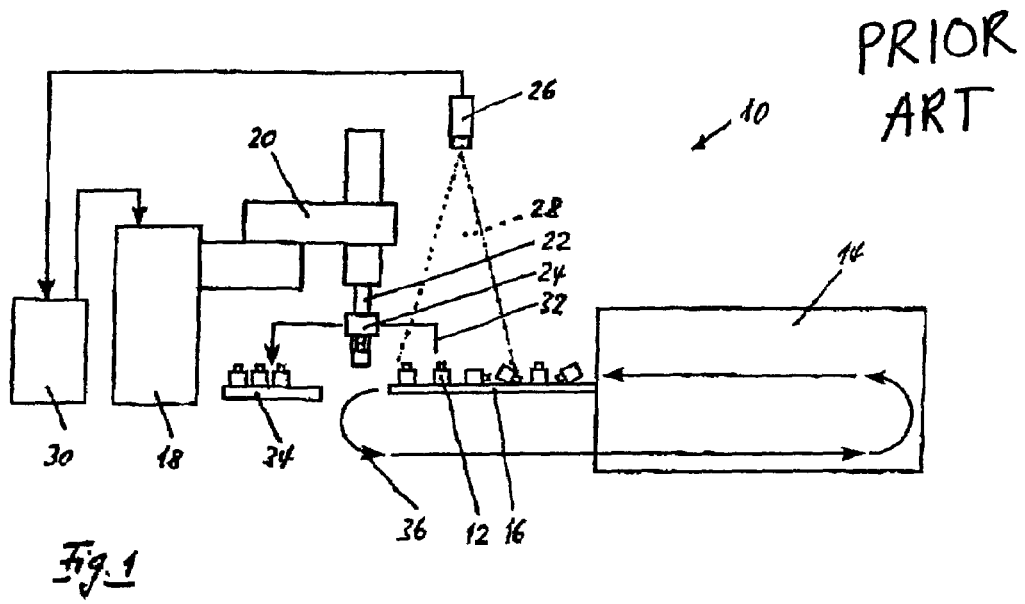
FIG. 1 shows a known device for feeding bulk material.

The robot 18 with oscillating arm and gripper tool is merely indicated; it is designed according to FIG. 1.

FIG. 8a shows a variant of an oscillating conveyor arm 44 with side guides 38, in the section at the level of the spring 64. The oscillating conveyor surface 16 is guided laterally with play into corresponding recesses 39.

Figure 9:
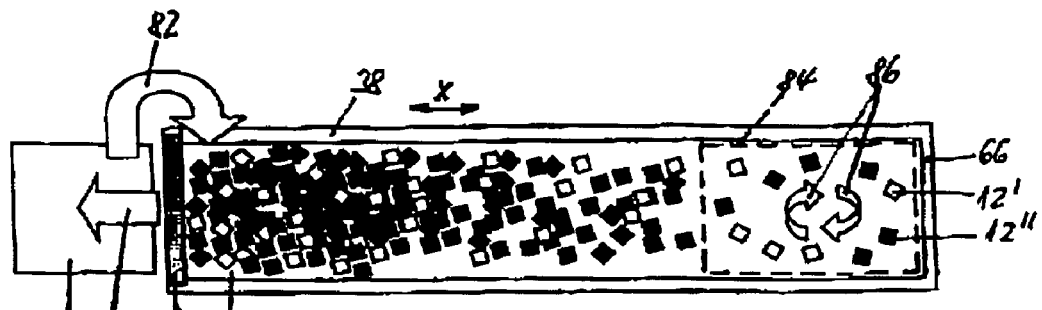
FIG. 9 shows a plan view of the region according to FIG. 2.
Figure 10:
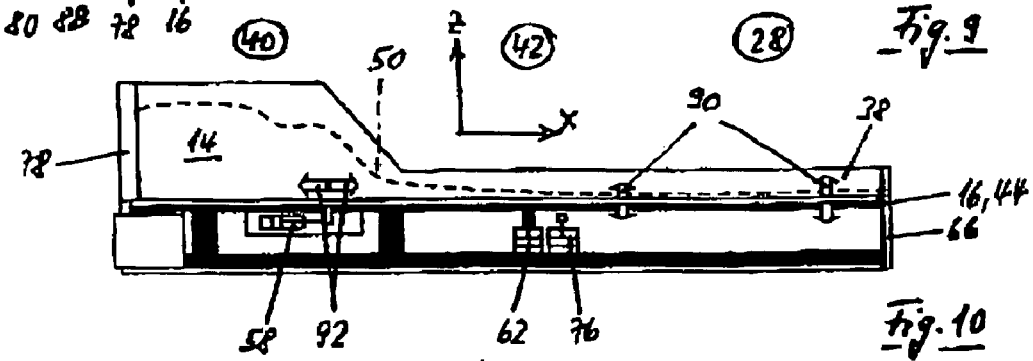
FIG. 10 shows a detailed embodiment of FIG. 4.

FIGS. 9 and 10 show FIGS. 2 and 4 in more detail and, in FIG. 9, loaded with bulk material items. The bulk material items 12 lie one above the other in multiple layers in the storage zone 40, in the store 14 at the beginning of the oscillating conveyor surface 16, so that as many bulk material items 12 as possible can be stored. Depending on their design, the bulk material items 12 are not interlocked, or else are more or less interlocked. The previous or new bulk material items 12 are poured in from an external container 80 and this is shown by an arrow 82. Emptying after the lifting of the part 78 of the edge 38 is characterised by arrow 88, and the bulk material items 12 fall into the container 80.

The distribution zone 42 which ends at the detection range of the camera 26 (FIG. 8) shown by dashed lines, or at the selection zone 28, begins at the exit of the storage zone 40. In this distribution region 42, the bulk material items 12 are prepared for entry into the selection zone 28; the bulk material items 12 transfer into a single position and separate owing to the rapid forward and reverse movements of oscillating conveyor surface 16 in the x-direction and the amplitude and speed of the oscillation in the z-direction increasing in the direction of the selection zone 28.

The selection zone 28, where the bulk material items 12 are arranged spaced apart from one another separately, begins after the distribution zone 42. Bulk material items 12' with a "good" position and alignment suitable for being grasped by the robot 18 (FIG. 1, 8) are drawn in white, non-graspable, "poor" bulk material items 12" in an unsuitable alignment are drawn in black. Once the good bulk material items 12' have been gripped, the remaining "poor" bulk material items 12" are realigned by oscillations in the z-direction; prior to this and/or simultaneously, new bulk material items 12 are pushed up by the conveyor system. The vision system signals to the feeder when the bulk material items are to be realigned by vertical vibrations. This process is characterised by the two arrows 86.

FIG. 10 indicates by dashed lines the level line 50 of the bulk material items 12. The arrows 90 in the z-direction show that the amplitude A (FIG. 14) of the oscillation of the oscillating conveyor arm 44 with the oscillating conveyor surface 16 increases in the direction of the front end 66 of the selection zone 28. The arrows 92 in the x-direction show that a forward and a reverse movement of the oscillating conveyor arm 44 is possible. Arranged next to the third cylinder 62 for generating the oscillations in the z-direction is a damping element 76, in the present case designed as a damping cylinder.

Figure 11:
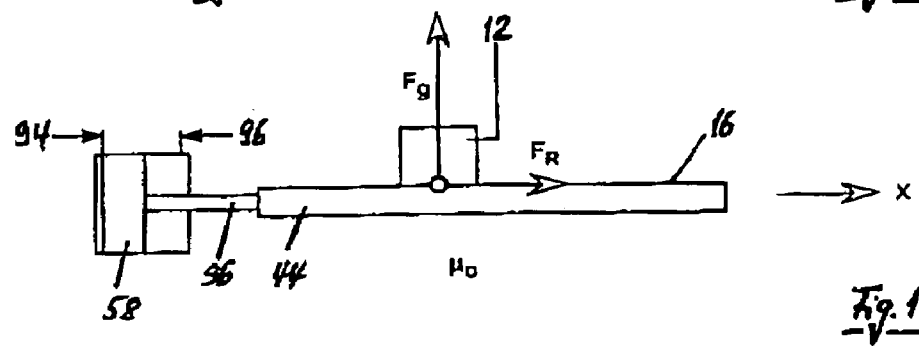
FIG. 11 shows a characterisation of a conveying principle in the starting position.

FIG. 11 indicates the starting position for the transport of a bulk material item 12 in the x-direction. A bulk material item 12 lies with a weight $F_g$ on the oscillating conveyor surface 16 of an oscillating conveyor arm 44. The coefficient of friction of the bulk material item 12 compared to the oscillation conveyor surface 16 is $\mu_0$. To displace the bulk material item 12, a frictional force $F_R$ has to be overcome. In the first means 58 for transport in the x-direction, a cylinder, two stop faces 94, 96 limit the lift of the piston, which is transmitted to the oscillating conveyor arm 44 by way of a piston rod 98. In the starting position, the piston of the cylinder 58 lies on the stop face 94.

Figure 12:
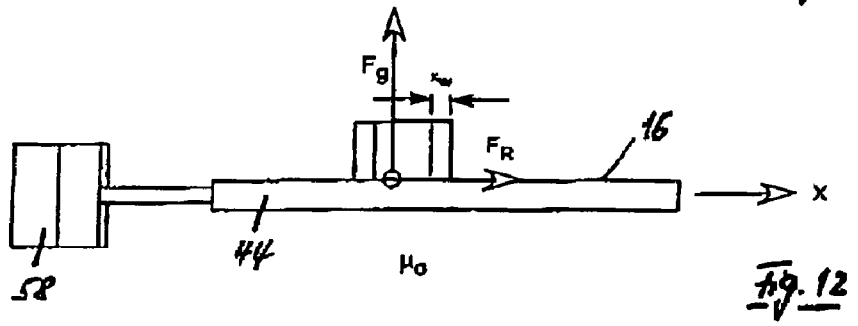
FIG. 12 shows the arrangement according to FIG. 11 after reaching a stop.
Figure 13:
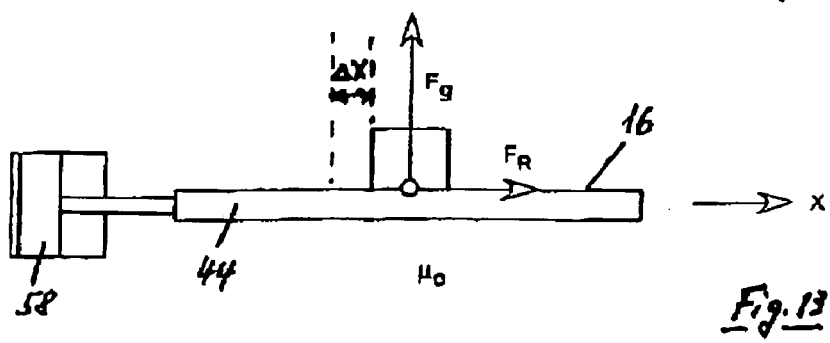
FIG. 13 shows an arrangement according to FIG. 11 after ending the reverse movement.

From this starting position, the cylinder 58 accelerates at a maximum $g*\mu_0$ (g=acceleration due to gravity) in the x-direction pointing away from the cylinder 58. The piston travels at full speed onto the stop face 96. During travel onto the stop face, the bulk material item 12 slips on the conveyor surface by $x_W$, the kinetic energy being destroyed. The delay during impact is substantially greater than $g*\mu_0$ (FIG. 12). After impact, the cylinder accelerates at a substantially greater acceleration than $g*\mu_0$ in the reverse direction and travels back to the stop 94. Because of the high reverse acceleration, the bulk material item 12 is only minimally pulled back, owing to inertia, it slips on the oscillating conveyor surface 12 (FIG. 13). A forward feed of Δx results per work cycle.

By reversing the sequence, the bulk material item 12 can also obviously move in the reverse direction.

Figure 14:
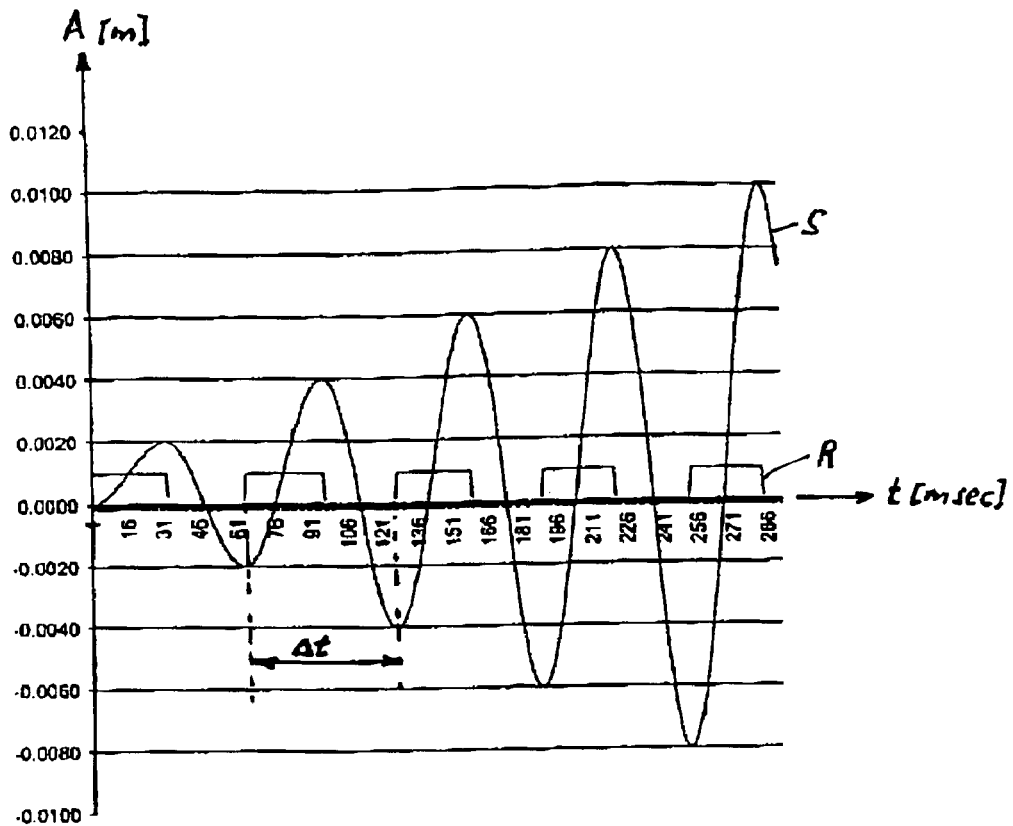
FIG. 14 shows an excitation of the oscillating arm by continuous rectangular signals.

The amplitude A of the oscillating conveyor arm 44 in the z-direction in the region of the sensor 74 (FIG. 8) is plotted in meters (m) over the time t in milliseconds (msec) in FIG. 14. Excitation by the third means 62 (FIG. 8) takes place at regular time intervals with a rectangular signal (R). The deflection takes place in the rhythm Δt of the previously detected inherent frequency. The amplitude A of the oscillation S increases after each excitation. On reaching the desired value, the excitation is reduced or at least temporarily dispensed with. An exceeding of the desired value can be corrected by the damping element 76 (FIG. 10).

The increase shown in FIG. 14 of the oscillating amplitude A is produced at the same position. These oscillation amplitudes A change when they are measured with respect to the x-direction inside or outside this position. A similar increase in the oscillation amplitudes A are established when they, without or with the same excitation, are measured at various positions more and more removed from the storage zone 50 with respect to the x-direction.

Figure 15:
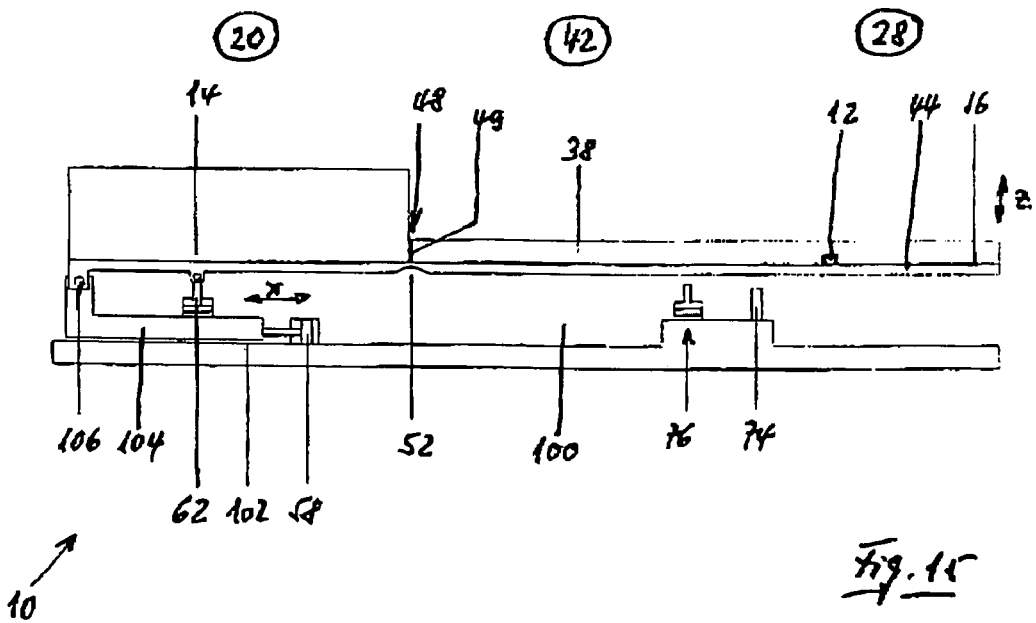
FIG. 15 shows a cut-open view of a small device for feeding bulk material items.

FIG. 15, in contrast to FIG. 8, shows a small device 10 for feeding bulk material items 12. The essential components, which are specified in the previous figures, are retained on a base plate 100. The oscillating conveyor arm 44 and the oscillating conveyor surface 16 are rigidly connected to one another. A linear guide 102 on the base plate 100 guides a slide 104 which is displaced in the x-direction by the horizontal lifting cylinder 58, the first means, and has an axis of rotation 106 for the oscillating conveyor arm 44. The lifting cylinder 62, the third means in the z-direction, engages the oscillating conveyor arm 44 in a non-resilient manner by way of a pin on the oscillating conveyor arm 44 and excites, with about a 1 mm lift, the oscillation at an amplitude increasing in the direction of the free end. In the present case, the spring constant is established by the design of the bending zone 48 with the transverse groove 52. The oscillating conveyor arm can also be moved in the x-direction with constructional measures which are known per se.

The invention claimed is:

1. A device (10) for feeding bulk material items (12) from a mass multiply arranged one above the other in a store (14) into a randomly re-alignable, individually distributed and disentangled position within the reach of a robot (18), the device (10) comprising a substantially horizontally arranged oscillating conveyor surface (16) with first means (58, 60) for the forward feed or reverse transport of the bulk material items (12) in a x-direction or in a x- and y-direction of the space coordinates, second means (62) for exciting an oscillation of the oscillating conveyor surface (16) in a z-direction of the space coordinates, means (26) for individual detection of the number, position and alignment of the individual bulk material items (12) and generating signals, and a processor (56) for processing the signals and generating control commands to actuators, wherein the entire surface area of a one-piece oscillating conveyor surface (16) is supported by an oscillating conveyor arm (44), which oscillating conveyor surface (16) with first or with first and second means (58, 60) is supported so as to be horizontally displaceable in the x-direction or in the x- and y-direction and extends from a storage zone (40) over a distribution zone (42) up to the front end of a selection zone (28) for the bulk material items (12) and projects freely, together with the oscillating conveyor arm (44), the storage (40), distribution (42) and selection zone (28) having an edge (38), and a third means for generating the oscillating motion (S) in the z-direction are connected to the oscillating conveyor arm (44).

2. A device (10) according to claim 1, wherein the oscillating conveyor arm (44) is rigidly mounted in the region of the storage zone (40), to form a desired bending region between the storage (40) and the distribution zone (42) and has at least one weakening area (52, 53) extending transversely.

3. A device (10) according to claim 2, wherein the weakening area is formed in two parts with a connecting leaf spring.

4. A device (10) according to claim 1, wherein the first and second means (58, 60, 62) are one of pneumatic, hydraulic lifting cylinders, electric linear, and stepping motors.

5. A device (10) according to claim 1, wherein a damping element (76) is arranged on the oscillating conveyor arm (44) for temporarily reducing the oscillating motion (S) in the z-direction.

6. A device (10) according to claim 5, wherein a sensor (74) is arranged for measuring the amplitude (A) and the frequency of the oscillating conveyor arm (44).

7. A device (10) according to claim 1, wherein a front end part (66) of the edge (38) of the selection zone (28) is removable.

8. A device (10) according to claim 1, wherein a front end edge (78) of the storage zone (40) is removable.

9. A device (10) according to claim 1, wherein the oscillating conveyor surface (16) consists of a wear-resistant material with an adjustable coefficient of friction for the bulk material items (12), in particular made of a polyamide, and/or the surface thereof is roughened and/or textured in design, and/or the surface thereof is coated, in particular with a woven fabric or nonwoven fabric.

10. A device (10) according to claim 9, wherein the wear resistant material is one of roughened polyamide and coated fabric.

11. A device (10) according to claim 1, wherein the oscillating conveyor arm (44) and the oscillating conveyor surface (16) are transparent at least in the region of the selection zone (28) and a backlight (72) is arranged below the selection zone.

12. A method for operating a device (10) for feeding bulk material items (12) from a mass multiply arranged one above the other in a store (14) into a randomly re-alignable, individually distributed and disentangled position within the reach of a robot (18), the device (10) comprising a substantially horizontally arranged oscillating conveyor surface (16) with first means (58, 60) for the forward feed or reverse transport of the bulk material items (12) in a x-direction or in a x- and y-direction of the space coordinates, second means (62) for exciting an oscillation of the oscillating conveyor surface (16) in a z-direction of the space coordinates, a vision system means for individual detection of the number, position and alignment of the individual bulk material items (12), and generating picture and a processor (56) for processing the sensor signals and generating control commands to actuators, characterised in that an oscillating motion (S) is generated in the z-direction with a programmable amplitude (A) which is continuously increasing in the x-direction, and therefore correspondingly increased speed and acceleration of the bulk material items (12), which oscillating motion (S) in the z-direction takes place alternatingly or at least partially simultaneously and coordinated with a forward feed or reverse transport of the bulk material items (12) in the x- or x- and y-direction, wherein, during the time period of the picture by the vision system means until removal of bulk material items (12) by the robot (18), all movements of the oscillating conveyor surface (16) in the x- or x- and y-direction are stopped and the oscillating motions (S) in the z-direction are damped or stopped.

13. A method according to claim 12, increasing oscillation motion (S) with an amplitude (A) is generated in situ in the z-direction until a desired value is reached, in that a corresponding, programmable oscillating motion, preferably with a frequency of 5 to 30 Hz, is transmitted to an oscillating conveyor arm (44) supporting the entire surface area of the oscillating conveyor surface (16) and freely projecting at least outside a storage zone (40).

14. A method according to claim 12, determining the specific inherent frequency in the z-direction of a machine configuration with the aid of a sensor (74) provided below the oscillating conveyor arm (44) and the third means (62) generate a corresponding frequency for an oscillating motion (S).

15. A method according to claim 12, wherein the forward feed movement of the oscillating conveyor surface (44) in the x- or x- and y-direction and the corresponding reverse movement take place at different acceleration, the bulk material items (12) sliding on the oscillating conveyor surface (16) because of their inertia at least during the greater acceleration.

16. A method according to claim 12, wherein forward feed movement of the oscillating conveyor surface (16) in the x- or x- and y-direction or the corresponding reverse movement is ended jerkily, in particular owing to a hard stop, with the bulk material items (12) sliding further in this direction because of their kinetic energy.

17. A method according to claim 12, wherein the processor (56) controls the movements of the oscillating conveyor surface (16) in the x-, y- and/or z-direction according to sensor signals by way of the number, position and/or alignment of bulk material items (12) in the selection zone (28).

18. A method according to claim 12, wherein once a proportion of poor bulk material items (12") established with the aid of sensor signals means (26) has been exceeded, the processor (56) triggers an actuator for opening the front end part (66) of the edge (38) of the selection zone (28), preferably only after a reduction in or stopping of the feeding of new bulk material items (12).

* * * * *